Nov. 20, 1945.　　　H. B. GROW　　　2,389,359
PILOT INSTRUCTING DEVICE
Filed June 24, 1941　　　2 Sheets-Sheet 1
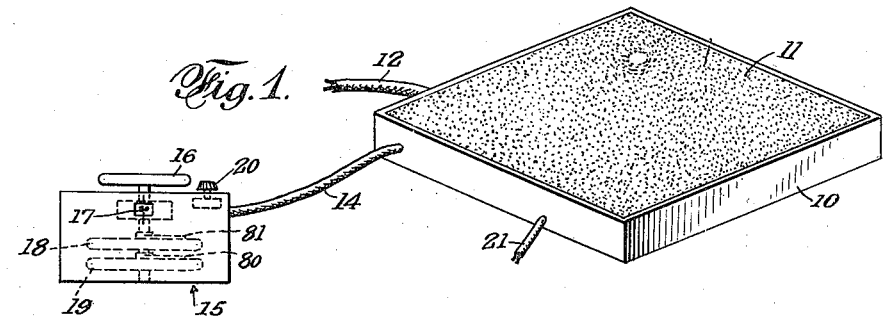
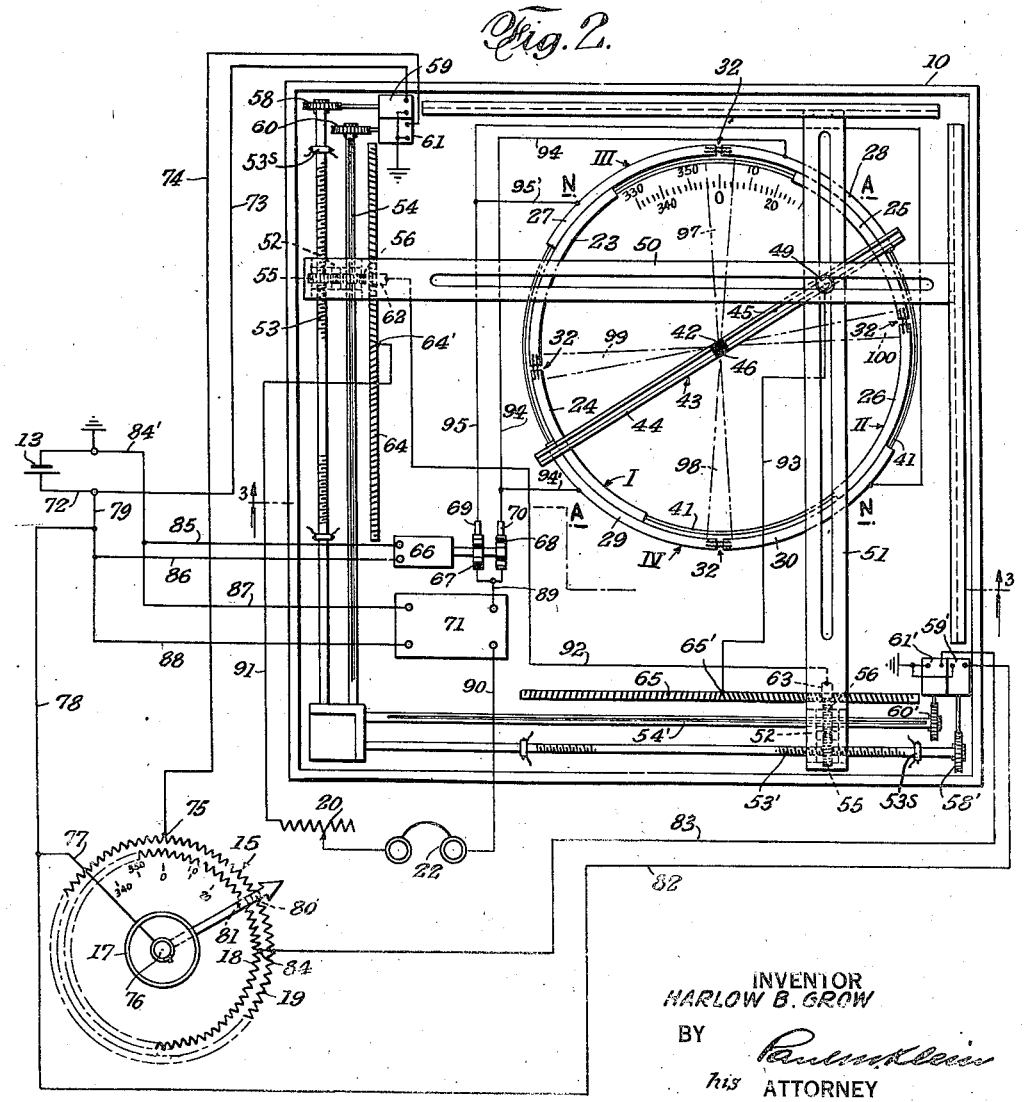
INVENTOR
HARLOW B. GROW
BY
his ATTORNEY Nov. 20, 1945. H. B. GROW 2,389,359
PILOT INSTRUCTING DEVICE
Filed June 24, 1941 2 Sheets-Sheet 2
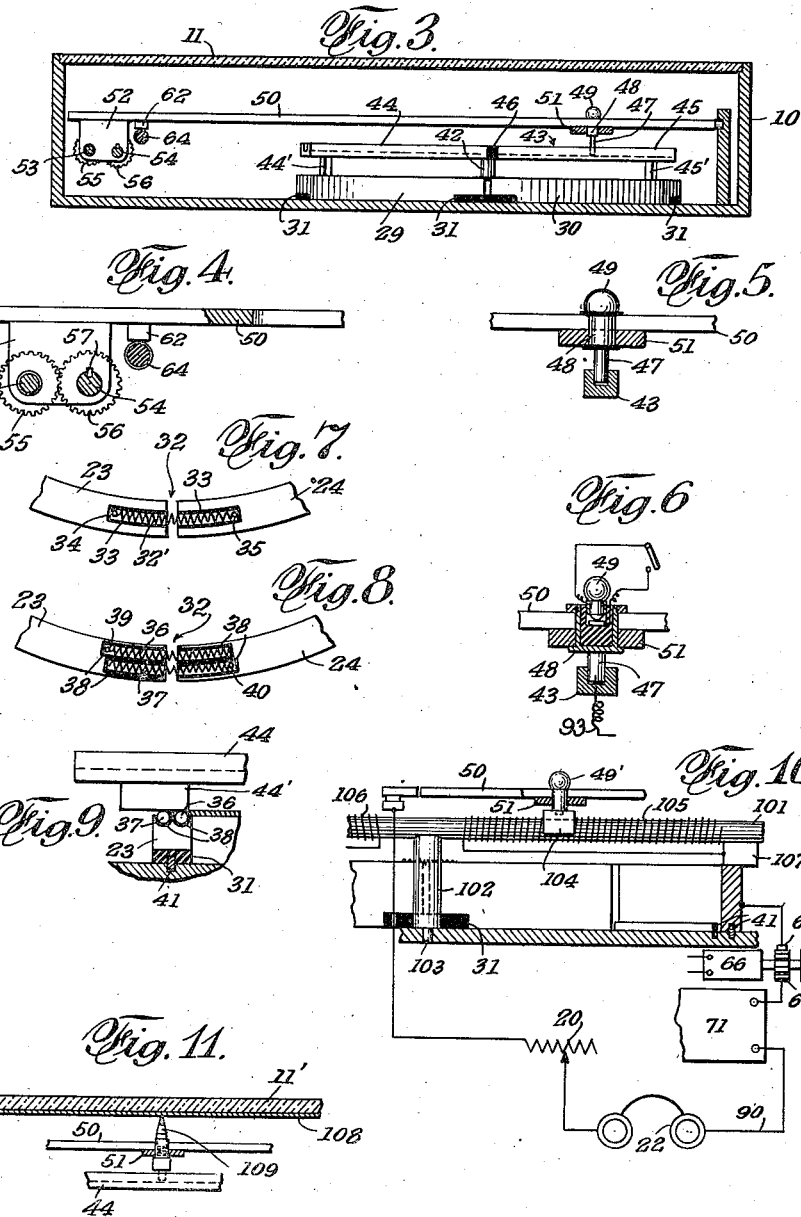
INVENTOR
HARLOW B. GROW
BY
his ATTORNEY Patented Nov. 20, 1945

2,389,359

UNITED STATES PATENT OFFICE 2,389,359

PILOT INSTRUCTING DEVICE

Harlow B. Grow, Freeport, N. Y.

Application June 24, 1941, Serial No. 399,435

4 Claims. (Cl. 35—12)

This invention relates to instructional or teaching devices in general, and especially to a device for training and instructing airplane pilot students to familiarize them with the control of aircraft by radio signals emanating from radio range signal stations, to the end of learning the use of such signals in aerial navigation.

While pilot training devices of more or less complicated and usually very costly constructions are known, they are mostly intended for teaching would-be pilots in the art of blind or instrument flying, while the present invention is primarily designed for the purpose of familiarizing pupil pilots with the technique of guiding a ship to a station or to a given point by radio range signals or directional radio beam signals, usually broadcast from stations located at or near airports. The signals intermittently propagated from such broadcasting stations are in the form of two basic signals, emitted from two cross secting directional antennas. One antenna emits the signal dash-dot or "N," while the other emits signal dot-dash or "A." These signals divide the area surrounding the broadcast stations into four zones, sectors or fields. In these fields there is a narrow cone-shaped strip where the signals "N" and "A" overlap and create a steady monotone in the form of a long dash or "T" signal. This is the beam or "on course" signal at which both signals "N" and "A" are of equal signal strength. This beam or "on course" or "T" signal, being sometimes called the leg, forms the guiding line for a plane to "ride home" onto the airfield. In the areas between the four beams the signals "N" and "A" are variously distinguishable. In zones immediately adjacent to the beams there will be a narrow area in which only a very slight variation between the strength of either signals "N" or "A" may be distinguished. This area is called the twilight band bordering beam. In zones further remote from the beam, the signals "A" and "N" will vary in their respective strength, depending at which side of the beam the signals are received. These zones are called the bi-signal zones. There is an "A" bi-signal zone and an "N" bi-signal zone, wherein the "A" and "N" signals, respectively, predominate. The further away the place of reception, the less of one signal will be heard and the more of the other signal, until only one of the signals will be heard. In such zones where only one signal is heard an airplane would be "off-course."

At the center of each of the four areas, or just above the broadcasting station, neither of the "N" or "A" signals can be heard. This area just above the station is called the "cone of silence," at which the signals "go dead." Evidently the area of this cone of silence grows larger with the distance directly above the broadcasting station. The broadcast stations transmitting the guide signals are preferably so arranged that each pair of beams are at right angles to the other pair.

The foregoing explanation of the arrangement of a complete radio range signal field is essential for the purpose of explaining my device, which latter is intended to simulate a complete radio range signal field, as well as a ship or airplane, intended to be guided by the pupil pilot in accordance with the emissions of signals from such signal field.

It is the object of this invention to produce an inexpensive, simple and efficient pilot training device, which will simulate an existing radio range station and an airplane in flight in respect to such station, and wherein means are provided for controlling the flight of a simulated airplane by the pupil pilot in accordance with the signals received automatically from the simulated station.

The foregoing and still further objects of this invention will become more fully apparent from the ensuing description, in connection with the accompanying drawings, which latter are intended for explanatory purposes only, without restricting the invention to the specific structure illustrated. In these drawings:

Fig. 1 illustrates a radio station and flight-simulating apparatus, and a pupil-manipulated control instrument;

Fig. 2 is a diagrammatical illustration of my device, as shown in Fig. 1, including the wiring thereof;

Fig. 3 is a partial cross section taken on line 3—3 of Fig. 2, including the cover of the device;

Fig. 4 is an enlarged detail view of a drive mechanism, indicated at the left of Fig. 3;

Fig. 5 is a detail view of the flight or plane indicator or rider;

Fig. 6 is a cross section therethrough in one of its preferred forms;

Figs. 7 and 8 illustrate portions of quadrant bars connected by resistances of various forms;

Fig. 9 is a detail view showing a portion of a quadrant bar, with its resistance and a contact arm with glide contact;

Fig. 10 is a diagrammatical modification of a signal volume control device; and

Fig. 11 is a modification of a ship or aircraft simulating rider in the form of a scriber.

Referring now more specifically to Figures 1 and 2, numeral 10 denotes a substantially closed casing, preferably provided with a translucent removable cover 11, which latter may be in the form of a ground glass or may take the shape of a record sheet backing or support, as will be presently explained. Into casing 10 leads a conduit 12 from a power source, indicated at 13 in Fig. 2. From casing 10 extends a cable 14, which leads to the pupil-manipulated control instrument 15, shown diagrammatically in Fig. 2, and which instrument comprises a hand wheel 16, a compass rose 17, two resistances 18 and 19, and an earphone volume control 20, which latter may be set for accommodating the hearing of the individual students. Another cable 21 extends from casing 10 and connects with a signal receiver, shown at 22 in Fig. 2 in the form of earphones, adjustable by variable volume control 20, seen diagrammatically in that figure.

Within casing 10 are located all instrumentalities for simulating a complete radio range signal station and an airplane in flight, as well as means for operating them. There are provided four arcuated and overlapping quadrant bars I, II, III and IV, arranged in a circle and adjustable relative to one another, representing the four legs and fields of a broadcast station. Each of the quadrant bars consists of two electrically and bodily separated segments or sections, such as sections 23 and 24 of bar I, sections 25 and 26 of bar II, sections 27 and 28 of bar III, and sections 29 and 30 of bar IV. The bottom ends of each two adjacent sections of each quadrant bar are preferably connected by an insulating member 31, shown clearly in Fig. 3, while the upper ends are bridged by insulated electrical resistances indicated at 32 in Figs. 2, 7 and 8. These resistances may be arranged in several ways, two forms of which are shown in Figs. 7 and 8. In Fig. 7 a single resistance 32' is indicated, which is insulated at 33 from the body of sections 23 and 24, to which latter the ends of the resistances are secured at 34 and 35. Another form of bridging resistances is shown in Fig. 8 where two resistances 36 and 37 are employed, which are also insulated at 38 from bar sections 23 and 24. Resistance 36 is electrically connected at 39 to bar section 23, whereas resistance 37 is electrically secured at 40 to bar section 24.

All quadrant bars or units are adjustable in relation to each other and are movable in a circle on suitable dielectric or insulated rails or similar means, indicated at 41, and are adapted to be adjustable to any desired position by the instructor for the student pilot. It will be observed that the inner quadrant units I and II contact with their outer end faces the inner end surfaces of outer quadrant units III and IV, and that thus the contacting sections of the units form continuations of one another.

Operatively mounted above the quadrant units, and centrally pivoted within the circle of these units at 42, is a contact bar 43 shown in one of its forms in Figures 2 and 3. This bar consists of two conductive legs 44 and 45, which are connected together by an insulating centerpiece 46. Depending from the lower surface of legs 44 and 45 of bar 43 are glide or brush contacts 44' and 45', seen clearly in Figs. 3 and 9. These contacts engage the upper surfaces of the quadrant units and establish positive electric connections between the legs of bar 43 and the quadrants. The bar is grooved for the reception of pin 47 (see Figs. 5 and 6), which extends downwardly from a mounting 48 of an aircraft simulating indicator or rider 49. The latter may be in the form of an electric bulb, supplied by an independent source of energy, not shown. The light of the bulb is intended to indicate the course imparted to the "airplane" by the student pilot, and may be read through the translucent cover 11. The light may be extinguished at will.

Mounting 48 of the ship or flight indicator is held in the slots of non-conductive or insulated control bars 50 and 51, the movement of which bars is intended to change the postion of indicator 49 relative to the quadrant bars, represented by the four sectors of the device. At one end of each of these bars there is arranged a gear casing 52, shown in detail in Fig. 4, within which casings are journalled threaded shafts 53 and 53' (see Fig. 2), and grooved shafts 54 and 54'. Between the two flanges or walls of each casing 52 are held two meshing gears in engagement with the shafts. Gears 55 are provided with an internal thread, engaging the thread of shafts 53 and 53', while gears 56 are each equipped with a key 57 which is designed to glide in the groove or slot of shaft 54 or 54'. The threaded shafts 53 and 53' are driven, through worm gear units 58 and 58', by constant speed motors 59 and 59', whereas slotted shafts 54 and 54' are operated, through worm gear units 60 and 60', by variable speed motors 61 and 61'. Motors 59 and 59' may also be of the variable speed type, if desired, but for the sake of simplicity only one set of motors is shown to be of variable speed.

The ratio of gears 55 and 56 is shown to be one to one, although such ratio may be varied if found more advantageous. Beneath slotted bars 50 and 51, near the gear casings, are mounted brush or glide contacts 62 and 63, which are adapted to ride over electrical resistances 64 and 65, the latter being tapped at their centers as indicated at 64' and 65'. Arranged also in the casing 10 is a signaling device, consisting of a motor 66, upon the shaft of which are mounted interrupter wheels 67 and 68, against which bear glide contacts 69 and 70. Interrupter wheels 67 and 68 are designed to produce, respectively, the signals "N" and "A," which are passed from an oscillator 71 to a signal receiving instrumentality, such as a loudspeaker or earphones 22.

*Electric connections*

In observing Fig. 2 it will be noted that all instrumentalities within casing 10 and without are supplied by a single source of energy 13. From one of the conductors 72, supplied by that source, branches off conductor 73, which leads to motor 59. The latter is connected along with variable speed motor 61 to the ground. From motor 61 a conductor 74 connects at 75 with the resistance 19, located in the pupil-manipulated control instrument 15 (see Figs. 1 and 2). Control post 76 of the instrument is connected through leads 77, 78 and 79 to conductor 72. To posts 76 are secured glider contacts 80 and 81 (see Fig. 1), which are mounted in line with one another, as diagrammatically indicated in the lower left-hand corner of Fig. 2. These glider contacts ride over resistances 19 and 18, respectively. Resistance 19 controls the speed of motor 61, while resistance 18 controls and varies the speed of motor 61'.

The wiring of the control for variable speed motor 61' is similar to that explained in connection with motor 61. From conductor 72, continuing through lead 79 and 78, there extends a wire 82 to motor 59'. From this motor current passes to the ground along with current from the grounded side of variable speed motor 61', while from the other terminal of motor 61' a wire 83 connects with tap 84 of resistance 18. It will be noted that both resistances 18 and 19 are circular in shape and are endless, and that their taps 84 and 75 are offset at 90 degrees to one another. Thus when glide contacts 80 and 81, riding simultaneously over resistances 19 and 18, respectively, assume a position in line with connecting tap 75, there will be no resistance in the circuit controlling motor 61, in consequence whereof the motor will operate at its maximum speed. At the same time in the circuit controlling motor 61' the current is forced to pass primarily through one quarter of resistance 18, thereby causing motor 61' to operate at medium speed. When the contacts assume a position over tap 84, full current will flow in the circuit controlling motor 61', thus causing the latter to operate at its maximum speed, while in the circuit controlling motor 61 the current now must pass primarily through one quarter of resistance 19, whereby motor 61 is caused to operate at medium speed. When the contacts are set to a point diametrically opposite tap 75, the maximum of resistance 19 is brought into the circuit of motors 61, thereby causing the latter to operate at its minimum speed, while at the same time primarily one quarter of the resistance 18 is placed in the circuit of motor 61', which will operate at its medium speed. The reverse takes place when contacts 80 and 81 are diametrically opposite tap 84. Motor 61' will then operate at its minimum speed, while motor 61 will rotate at its medium speed. The importance of this arrangement will become more clearly evident under the heading "Operation."

*Audio circuit*

The other or second conductor 84', connected with the source of energy 13, branches off at 85 and leads to motor 66 of the signal emitting instrumentality, while wire 86 passes from motor 66 to branch 79 of conductor 72. Note that conductor 84' is grounded.

Another leg 87 of conductor 84' leads to oscillator 71, and a wire 88 reverts to branch 79 of conductor 72. From signal wheels 69 and 70 passes an input wire 89 into oscillator 71, and an output wire 90 is connected with earphones 22. From the earphones current is passed through individual, hand-adjustable volume control 20, and from there by lead 91 to central tap 64' of resistance 64. From this tap current flows through a portion of resistance 64 to glide contact 62, mounted at the bottom of bar 50. Glide contact 63 of bar 51, riding over resistance 65, is connected by lead 92 with contact 62, whereby current is conveyed from contact 62 to contact 63, through a portion of resistance 65 to its tap 65'. This tap is connected by lead 93 with pin 47 of indicator 49. From the latter audio current is directed through either of the two conductive legs of contact bar 43 and brush contacts 45' or 44' to the quadrant units beneath these contacts. Contacts 62 and 63, which are electrically independent of bars 50 and 51, and being connected by wire 92, bring resistances 64 and 65 in series with one another. Through the movements of bars 50 and 51, their respective contacts 62 and 63 are caused to slide over resistances 64 and 65 and vary the audibility or strength of the signals; such signal strength variation simulates reception of signals at various distances from the range station.

As shown in Fig. 2, sections 25 and 28 of quadrants II and III, at the right-hand upper corner of the device, are in electric contact with leg 45 of bar 43. Section 28 of the quadrant III is connected by lead 94 with brush 70 of signal producer or interrupter 68. Thus the audible signal in the earphones will be dot-dash or the letter "A." A branch 94' from lead 94 connects with section 29 of quadrant IV, and if indicator 49 would be in the groove of contact bar leg 44, an "A" signal would also be heard.

Brush 69 of interrupter 67 is connected by leads 95 and 95' to section 27 of quadrant III, and through the continuation of lead 95 to section 30 of quadrant IV.

The area within the four quadrants I, II, III and IV, is provided with compass graduations of 360 degrees in a complete circle, which graduations correspond to that provided on the compass rose device of the pupil-manipulated control instrument at 17. The graduations within the quadrant circle also serve for varying the positions of the legs to represent any particular radio range station. Such adjustment is made by the instructor. For the purpose of better understanding the graduation in Fig. 2 is shown in a circle within resistances 18 and 19.

It is assumed that the top edge of casing 10 in Fig. 2 is directed towards "North," and the "North-South" direction is indicated by beams or legs 97 and 98, shown in broken lines. The corresponding crossing legs are similarly indicated at 99 and 100, and point approximately "West" and "East."

*Operation*

From the diagram in Fig. 2 it is evident that resistances 18 and 19 control the motor speeds of variable motors 61' and 61. Obviously another set of two resistances may be added for controlling the speeds of motors 59 and 59' if desired.

Indicator 49, representing an airplane in flight, is the object which is to be directed by the pupil pilot in accordance with the instruction of the teacher. This indicator is placed at the junction of slotted control bars 50 and 51 and engages with its conductive extension 47 contact bar 43. When either or both of control bars 50 and 51 are moved, these movements are imparted to indicator 49, which in turn will move in a direction induced by the movements of the control bars. Thus when bar 50 is caused to move upwards or downwards, while bar 51 is stationary, indicator 49 will move in northward or southward directions. When bar 51 moves from right to left or left to right, while bar 50 is stationary, indicator 49 will move either in westerly or easterly directions. By a combined movement of both bars, indicator 49 will follow a course corresponding to the resultant of the compound movements of bars 50 and 51. When it is desired to actuate one of the slotted control bars, say bar 50, while bar 51 remains stationary, such movement is produced by increasing or decreasing the speed of slotted shaft 54 in respect to the constant normal speed of threaded shaft 53, while both shafts 53' and 54' of bar 51 are kept turning at normal speed.

Referring to Fig. 4, assume now that shaft 53 revolves at normal speed clockwise while shaft 54 revolves at a lower speed counterclockwise. In that case gear housing 52 with the gears and bar 50 will move toward the observer. When shaft 54 is now turned at a higher speed than shaft 53, the movement of bar 50 will be reversed. When the speeds of both shafts are equal, the entire assembly will be at a standstill. It is of course assumed in this case that the gear ratio is one to one. By changing that gear ratio different movements of guide bars 50 and 51 will result.

For the purpose of better understanding it is assumed that the normal speed of both shafts is 100 R. P. M., and that the movement of threaded gears 55 is one inch per minute at that speed. Assume further that the threaded shaft or spindle is provided with 16 threads per inch. Thus it will be necessary to increase the speed of shaft 54 to 116 R. P. M. in order to impart to bar 50 a movement of one inch per minute in the direction away from the observer. When, on the other hand, the speed of shaft 54 is reduced to 84 R. P. M., bar 50 will move towards the observer at the rate of one inch per minute. Inasmuch as resistance 19 controls the speed of motor 61 within the range from 84 R. P. M. to 116 R. P. M., any rate of movement of bar 50, ranging from zero to one inch per minute in either direction may be obtained.

The same arrangement applies to motor 61' controlled by resistance 18. Through the combined control of speeds of motors 61 and 61', bars 50 and 51 may be moved in either direction singly or in conjunction with one another, whereby flight indicator or rider 49 is accordingly positioned in respect to the area within the quadrant bars. If now the instructor requires the pupil pilot to move the plane, represented by indicator 49, in due north direction, the pupil will bring his control instrument, by the use of hand wheel 16, to a zero setting which corresponds to north. By so doing bar 51 will remain stationary, whereas bar 50 will move upwards, taking with it indicator 49.

The northward movement of bar 50 is caused by the fact that when the control instrument is set to zero, contact 80, riding over resistance 19, will rest against tap 75, whereby resistance 19 is completely eliminated and the full current passes to motor 61, which motor, when thus supplied by the full current, will revolve shaft 54 at the maximum speed of 116 R. P. M. At the same time contact 81 is placed over one-quarter of resistance 18, whereby motor 61' will operate at its medium speed, at which shaft 54' will rotate at 100 R. P. M., which rate of rotation is that of shaft 53'. Consequently bar 51 will be at a standstill, and only bar 50 will move northwards. When contacts 80 or 81 are placed opposite tap 75, the indicator will move south; when the contacts are placed opposite tap 84, the indicator will move westward. At settings of glide contacts 80 and 81 to any other position between the taps, varying speeds are imparted to motors 61 and 61', whereby bars 50 and 51 will accordingly change their respective positions. In this manner indicator 49 may be brought to any desired point in respect to the simulated radio station. Obviously the arrangement of the glide contacts and resistances may be altered for producing other types or combinations of movement of the bars; especially such changes will be required when motors 59 and 59' are intended to have variable speeds also.

In order to prevent the movement of bars 50 and 51 beyond their intended travel over their simulated field, suitable spring equipped end stops 53S are provided with the threaded spindles 53 and 53'. The threads of the spindles end a short distance from stops 53S, and the springs of the stops tend to bring gears 55 into operative engagement with the spindle threads when the setting of glide contacts 80 and 81 over their respective resistances is changed.

Radio signals

For the purpose of simulating the reception of directional signals from a radio field, according to which signals the pilot student is to direct the airplane, the present arrangement is so constructed that signals emanating from the already-mentioned signaling device will be heard through earphones 22. The directional signals "N" and "A" are being constantly emitted. As indicator 49 is moved by bars 50 and 51, and in turn moves contact bar 43 over quadrants I, II, III and IV, the signals "N" and "A" will be heard. Sections 24 and 29 of quadrants I and IV, and sections 25 and 28 of quadrants II and III, carry the signal "A," whereas sections 23 and 27 of quadrants I and III, and sections 26 and 30 of quadrants II and IV, carry the signal "N." Thus when indicator 49 is caused to move between radio legs 97 and 100, or legs 98 and 99, signal "A" will be audible to the student pilot. When the indicator travels between legs 98 and 100, or legs 97 and 99, the "N" signal is heard.

The audibility of these signals will change with the distance of indicator 49 from the broadcast station, represented by the center 46 of bar 43. This change of audibility is caused by the movement of bars 50 and 51 in respect to resistances 64 and 65, which latter are in the audio circuit. The further away brush contacts 62 and 63 of the bars are from center taps 64' and 65' of the resistances, the more resistance is placed in the circuit, and the weaker the signals will become. As the bars move nearer to the station, the signals will gain in strength.

When the indicator is brought within any one of the four leg cones 97, 98, 99 and 100, the signal reception will become considerably altered, reference being had to Figures 2, 3, 7, 8 and 9. It had been stated previously that each two adjacent sections of each quadrant are bridged by resistances 32, over which ride brush contacts 44' or 45' of contact bar legs 44 and 45, respectively. As indicator 49 is moved into any of the cone areas, and its movement gradually progresses towards the center or separating point between the quadrant sections, one of the brush contacts will engage the bridging resistance at one of its ends and move towards its middle. The moment a portion of the resistance is brought into the audio circuit, both signals "N" and "A" will be received, the weaker being keyed in to produce an underlying "on-course" signal. The composite being the "bi-signal" or "twilight zone."

Assume that the indicator in Fig. 2 moves in clockwise direction as it approaches leg 100. Signal "A" is heard alone until arm 45 of bar 43 reaches a position over the bridging resistance 32 at right. As arm contact 45' touches the end of the resistance, signal "A" still will be heard very strongly, but signal "N" will be received, although faintly. At that position the indicator will be in the "A" bi-signal zone.

As now the indicator progresses towards the separation of sections 25 and 26, or towards the middle of the bridging resistance, the "A" signal will become gradually less audible, while the strength of signal "N" will increase. When the indicator is placed in a position at which brush contact 45' nears the middle of the bridging resistance, the signals will become nearly equal in strength. At that position the indicator is in the "twilight band" bordering the "on course" leg.

The indicator is in the "on course" leg when the brush contact is at the center of resistance 32, at which position the signals are of equal strength and merge to the signal "T," a long monotonous dash.

When the pupil pilot has found the leg, the problem arises of ascertaining which one of the legs or beams has been encountered, and it is required to identify such beam. There are several methods whereby this is accomplished, such as the 90 degree method, the parallel course method, the outbound course method, which methods are well-known and require no further explanation. These methods may be duplicated in the present device by the pilot student.

Cone of silence

In order to simulate the "cone of silence," contact arm 43 is made in two parts connected by a non-conductive center 46. When the rider or indicator 49 reaches this center the tone signals will cease. For the purpose of correctly maintaining flight "on course" along the center of the beam, it is important that the pilot readily recognizes the "twilight band" bordering the beam. As has been stated, this "twilight band" is simulated in the present device by the employment of resistances 32 bridging each two sections of a quadrant. When the brush or glide contacts of contact arm 43 pass over these resistances, one of the signals will become stronger, while the other diminishes in strength, and vice versa, depending upon the direction of movement of arm 43. The strength of the signals within the segments between the four beams being governed by the movement of bars 50 and 51, the signals will diminish in strength when the bars travel from the center points or taps 64' and 65' of resistances 64 and 65 in either direction and will be strongest when the bars are in line with the taps. By this arrangement the "A" and "N" bi-signal zones, as well as "off-course" areas for "A" and "N" signals are simulated.

From the above explanation it will be quite evident that all maneuvers of an aircraft in flight, directed by radio range signals emitted from a field, may be simulated by the present device.

Modifications

In Fig. 10 a modified form of a contact arm is shown at 101, which is intended to be of non-conductive material, and which is supported by a non-conductive central post 102, pivoted at 103. Indicator 49' is equipped with a rider contact 104, which is intended to travel over resistances 105 and 106. These resistances substitute resistances 64 and 65, shown in Fig. 2. Contact bar 101 is equipped with glide contacts 107, in the same manner as bar 43 is provided with contacts 44' and 45'. The operation of the device with the modified contact bar is identical with that explained in connection with Fig. 2, except that the positions of the resistances are changed.

Another modification of the flight indicator is shown in Fig. 11, wherein the top or cover 11' is provided at its undersurface with an exchangeable chart sheet 108, and wherein flight indicator 109 is in the form of a scriber, contacting chart sheet 108 and impressing or recording all movements of indicator 109 upon that sheet, unknown to the pilot student.

In Figs. 1 and 2 the pupil-manipulated control instrument is shown to have means for manually actuating it. When my apparatus is employed in a classroom a manual control of the type indicated will suffice. If, however, the entire instructing device is placed, for instance, into a training plane, it is intended that the device be coupled with the gyro compass of such plane, and that the manipulation of the control instrument takes place through the usual control instruments employed in the plane. For this reason, and because my device is capable of being adapted for uses other than mentioned, it is repeated that the illustrations are by no means intended to limit me to the structure shown, and that the device may be altered in order to adapt it for any desired use. Also in other respects it is intended to make changes and improvements in the device, especially as applied to the instrumentalities contained in casing 10, and I therefore reserve for myself the right to make changes and improvements in my invention, all within the broad scope of my invention, as expressed in the annexed claims.

I claim:

1. In a pilot instructing device or the like, a substantially closed casing having a removable cover intended to simulate a flying field, a rider movable beneath the cover and intended to simulate an aircraft in flight, means associated with the rider for indicating its position in respect to the cover, an electric source of power, a set of four concentrically arranged electrically cooperating, relatively movable quadrant bar units disposed below the operating area of the rider, each unit comprising two arcuated electric conductors joined by a fixed electrical resistance, the conductors of each two adjacent units contacting with and overlapping one another, a rider support and guide centrally pivoted in respect to the quadrant bar units and comprising two centrally insulated conductive rider guides in gliding contact with the quadrant bar units, a pair of rider-operating bars movable at right angles to one another and electrically insulated from the rider, insulated glide contacts provided with the bars, electrically actuated means for operating said rider-operating bars and said glide contacts, electrically operated sound producing instrumentalities for emitting "A" and "N" signals, electric sound receiving means for said signals, variable resistances interposed between said sound producing and said sound receiving means, and being engaged by said glide contacts of the rider-operating bars, the intensity of the signals being governed by the position of the glide contacts in respect to the variable resistances and by the position of the rider support in respect to the fixed resistances connecting the conductors of the quadrant bar units, a compass rose-representing variable resistance unit for controlling the operating means for said rider-operating bars; said electric power source energizing two circuits, one including the set of quadrant bar units, the rider support, the variable resistances, the sound producing instrumentalities and said sound receiving means, and the other circuit including the electrically actuated means for the rider-operating bars and said variable resistance unit.

2. In a pilot instructing device or the like, a casing, a removable cover for the latter, said cover representing a flying field, a rider representing an aircraft in flight and being operative beneath the cover and having means for indicating its position in respect to the latter, means within the casing for producing audible "A" and "N" signals, means without the casing for the reception of these signals, other means within the casing for controlling the intensity of the signals according to the position of the rider in respect to the cover, means operative within the casing for positioning the rider in respect to the cover, and means without the casing for controlling said rider positioning means and representing a compass rose, and an electric power source supplying current to said signal producing and said rider positioning means, said rider positioning means comprising two cooperating rider-engaging members movable at right angles to each other and a members-actuating mechanism which includes two rectangularly disposed double shaft units, each composed of two parallel, individually driven shafts, and two pair-sets of intermeshed gears, one for each of the members, the gears being in operative engagement with the shafts of each unit.

3. In a pilot instructing device or the like, a casing having a removable cover, the latter representing a flying field, a rider operative beneath the cover and representing an aircraft in flight and having means for defining its position in respect to the cover, electric signal emitting means and an electrically operated mechanism for positioning the rider in respect to the cover within the casing, and signal receiving means and control means for said mechanism without the casing, said control means representing a compass rose, and means interposed between said signal emitting and signal receiving means for governing the intensity of signals, said rider operating mechanism comprising at least two series of parallel shafts disposed at right angles to each other, each shaft series being composed of a threaded shaft and a smooth shaft, the latter having a keyway extending longitudinally along substantially the entire length of the shaft, individual electric motors driving the shaft series, the operation and speed of the motors being governed by said control means, an intermeshed gear assembly operative with each shaft series and comprising an internally threaded gear engaging the threaded shaft and smooth-bore gear having a key and being in gliding engagement with the smooth shaft, the gear key being guided in the keyway of that shaft; at least two rider-operating bars movable at right angles to each other, one of said gear assemblies fixedly associated with each bar and facilitating the movement of one bar relative to the other through the operation of the shaft series.

4. In a pilot instructing device or the like, as per claim 3, said signal intensity governing means comprising variable resistances extending along said shaft series and being engaged by a gliding contact associated with each rider-operating bar, a set of four concentrically arranged electrically cooperating quadrant bar units disposed below the operating area of the rider and being adjustable relative to each other, each unit comprising two arcuated conductors joined by fixed resistances, the conductors of each two adjacent units engaging and over-lapping one another, a rider support and guide centrally journaled relative to said quadrant bar units and comprising two aligned conductive arms insulated from each other at their journaled center, the arms being in gliding contact with the quadrant bar units, the positioning of the rider-operating bars in respect to the variable resistances and the location of the rider support arms in respect to the fixed resistances joining the quadrant bar unit conductors determining the strength of the signals audible in the signal receiving means.

HARLOW B. GROW.